United States Patent [19]

Jensen

[11] 4,316,763
[45] Feb. 23, 1982

[54] APPARATUS FOR FORMING A MARGINALLY REINFORCED HOLE IN A THERMOPLASTIC SHEET MATERIAL

[76] Inventor: Ole R. Jensen, No. 61 Dortheavej, Copenhagen, Denmark, 2400

[21] Appl. No.: 133,860

[22] Filed: Mar. 25, 1980

[30] Foreign Application Priority Data

Apr. 6, 1979 [DK] Denmark .................. 1414/79

[51] Int. Cl.³ ................. B26D 5/08; B32B 31/18
[52] U.S. Cl. ..................... 156/513; 156/514; 156/515; 156/530
[58] Field of Search ........... 156/251, 261, 285, 380, 156/497, 513, 514, 515, 518, 529, 530, 272; 277/58, 61, 62

[56] References Cited

U.S. PATENT DOCUMENTS

| | | | |
|---|---|---|---|
| 3,226,283 | 12/1965 | Villalon | 156/530 |
| 3,457,815 | 7/1969 | Cahill | 156/530 |
| 3,585,095 | 6/1971 | Shearhod | 156/513 |

*Primary Examiner*—Caleb Weston
*Attorney, Agent, or Firm*—Bacon & Thomas

[57] ABSTRACT

A marginally reinforced hole is provided in a sheet of weldable material by first welding a reinforcing ring to one sheet surface by means of a tubular electrode applied to its opposite surface while locating said ring by means of a pressure shoe presenting an internal cavity that is open at its bottom, and then admitting a pressurized gaseous fluid to said cavity to blow away the waste sheet material within the ring after the temperature of the sheet material within the welding area has reached the melting point.

1 Claim, 2 Drawing Figures

4,316,763

APPARATUS FOR FORMING A MARGINALLY REINFORCED HOLE IN A THERMOPLASTIC SHEET MATERIAL

BACKGROUND OF THE INVENTION

Within different technical fields, e.g. in the manufacture of collection pouches for receiving drainage from an artificial abdominal opening, a need exists for forming a marginally reinforced hole in a thin thermoplastic sheet material. For this purpose it has been suggested to weld a prefabricated ring or eyelet to the sheet material to surround the hole which may be formed by a stamping or cutting operation either before or subsequent to the welding operation or possibly simultaneously therewith.

In the first case the accurate aligning of the ring with the pre-stamped hole is of vital importance as, otherwise, an edge portion of the sheet material may protrude inwardly from the inner periphery of the ring so as to form a rather hard flap or fin that will cause much nuisance to the user of a pouch of the type referred to in the foregoing. Even when much care is taken, the perfect aligning of the ring or eyelet relative to the edge of the hole may cause great trouble due to the fact that the sheet material is normally rather thin and elastic.

It may be possible to at least substantially eliminate the disagreeable fin by performing the stamping operation subsequent to or at the same time as the welding operation but, then, a more complicated machinery must be used and in the latter case the quality and strength of the welding seam may further be detrimentally influenced by the strains to which the sheet material is subjected due to the operation of the stamping tool.

The embarrassing flap or fin may be completely eliminated when the sheet material inside the ring is cut away, during or after the welding operation, by means of a rotary knife following the inner periphery of the ring. However, a rather complicated mechanism is then necessary, and there is a substantial risk that the operation of this mechanism will be disturbed by the heat influence from the welding zone, especially then the welding and cutting operations are performed at the same time in order to minimize the total processing time.

PURPOSE OF THE INVENTION

The main purpose of the invention is to provide a method and an apparatus enabling a complete removal of the sheet material inside the ring or eyelet in an extremely simple manner and without any detrimental effect on the welding seam. Further, no extra processing time nor complicated mechanical means being required for the removal step.

SUMMARY OF THE INVENTION

In its first aspect the invention relates to a method of forming a marginally reinforced hole in a thermoplastic sheet material, including the steps of welding a prefabricated reinforcing ring or eyelet to the sheet material at the intended location of the hole, and removing the waste sheet material inside the ring or eyelet during the welding operation by subjecting one surface of said waste material to a pressurized gaseous fluid at the moment when the sheet material within the welding zone has become melted or at least has reached such a temperature that it has lost its inherent coherence. In this way the waste material is simply blown away and leaves a marginally reinforced hole bounded by an absolutely smooth surface formed by the united sheet and ring material.

In its other aspect the invention relates to an apparatus for forming a marginally reinforced hole by the method described above and including a tubular electrode having an exposed annular end face, and a cup-shaped pressure shoe for positioning a reinforcing ring opposite to said annular end face with the sheet material interposed therebetween, said pressure shoe being connectable to a pressurized gaseous fluid source through conduit means to admit such pressure fluid to the sheet material inside the prssure shoe when the melting temperature of the sheet material has been reached in the operative position of the tubular electrode and the pressure shoe.

BRIEF DESCRIPTION OF THE DRAWING

A preferred embodiment of the method and the apparatus according to the invention will now be more fully described with reference to the drawing in which.

DETAILED DESCRIPTION OF THE PREFERRED EMBODIMENT

Figure 1:
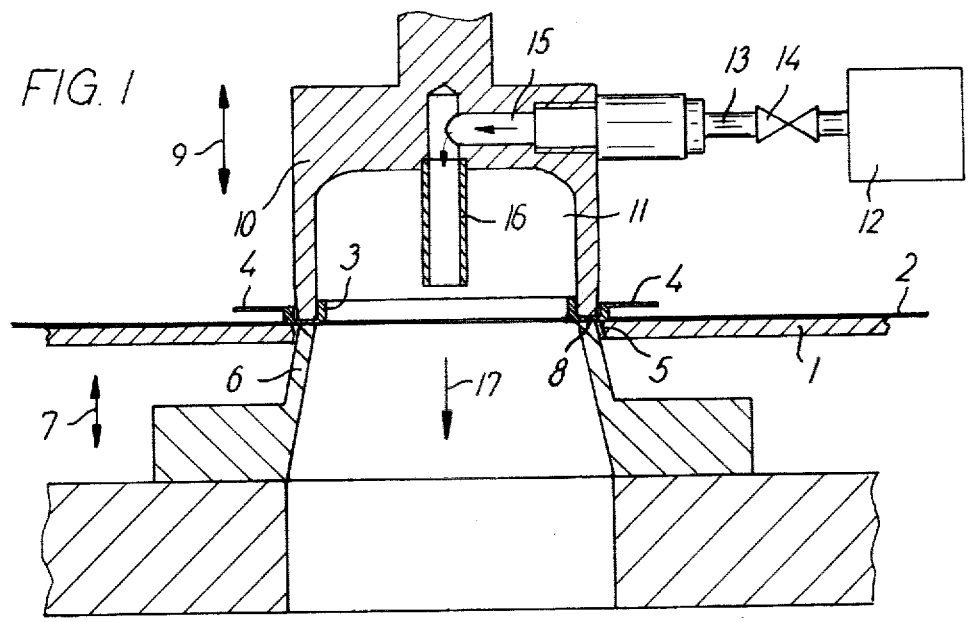
FIG. 1 is a rather diagrammatic vertical sectional view of the tubular electrode and the pressure shoe in their operative positions relative to a sheet material and a reinforcing ring located thereon, and FIG. 2 a similar view of the same elements in a previous stage of the operation.

Referring now to the drawing, 1 indicates a stationary table forming a support for a thin sheet 2 of thermoplastic material that may be advanced stepwise along the table top and to which a ring or eyelet 3 is to be welded to form a marginal reinforcement around a hole in the sheet material. The ring or eyelet 3 may be of known type and comprises an annular body of substantially U-shaped cross-section and provided with a pair of opposed ears 4, but the detailed design of the ring is immaterial as it relates to the invention.

An aperture 5 in the table 1 has a configuration that is substantially similar to the radially inner configuration of the ring 3 but of a slightly greater diameter. A lower tubular electrode 6 is vertically movable, as indicated by the double ended arrow 7, between an inoperative position (FIG. 2) and an operative position (FIG. 1) in which its exposed end face 8 is flush with the top of the table 1 within the aperture 5. This electrode 6 may be energized in any conventional manner by means not shown on the drawing.

Figure 2:
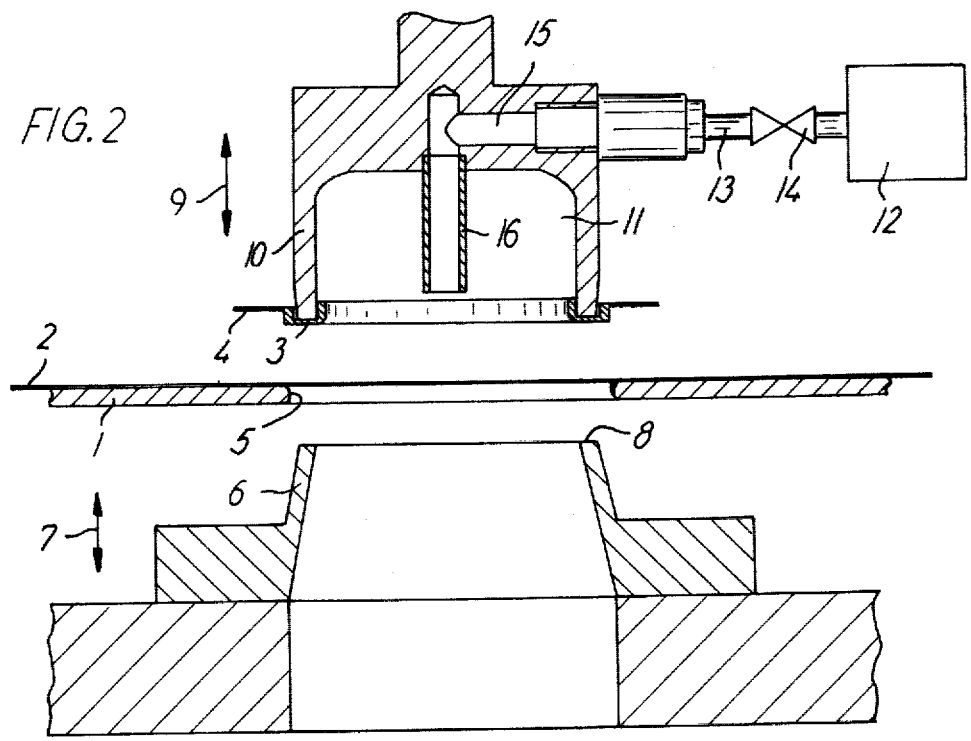

Also movable in a vertical direction, as indicated by the double ended arrow 9, is a cup-shaped ring carrier or pressure shoe 10 to properly locate the reinforcing ring or eyelet 3 opposite to the electrode end face 8. From its inoperative position (FIG. 2) in which the reinforcing ring 3 is held by friction to the lower edge of the pressure shoe 10, this member may be lowered to bring the ring in contact with the upper surface of the sheet 2, as shown in FIG. 1. In this position the cavity or chamber 11 formed by the pressure shoe is closed at its bottom by the sheet material lying inside the ring 3, and the welding may be performed in the usual way. By this welding the temperature of the sheet material within the welding zone, i.e. between the electrode end face 8 and the ring 3, is raised so as to exceed the melting point of the sheet material and when this temperature has been reached, pressurized gaseous fluid from a source 12 is admitted through a conduit 13 with a control valve 14, a bored channel 15, and a short tube 16 to the cavity 11. As a result, the sheet material confined inside the ring 3 is blown away as indicated by the arrow 17, thus leaving a marginally reinforced hole in the sheet material 2 bounded by a very smooth edge face without any protruding flaps or similar irregularities.

Although in the embodiment illustrated on the drawing the marginal reinforcement is formed by a rather thick-walled ring member, the principles of the invention may also be used when the ring member itself is a piece of sheet material. This piece may form a label with an adhesive on its upper surface.

I claim:

1. Apparatus for forming a marginally reinforced hole in a thermoplastic sheet material comprising a table with a sheet supporting surface and having an aperture with a configuration that is substantially similar to but slightly greater than the radially inner configuration of a reinforcing ring to be used, a tubular electrode with an exposed end face having an inner configuration corresponding to the inner configuration of the reinforcing ring and being movable between an operative position in which it is substantially flush with the sheet supporting surface of the table, and an inoperative position spaced therefrom, and a cup-shaped pressure shoe to properly locate the reinforcing ring opposite to the end face of the tubular electrode, the cavity of said pressure shoe being connectable with a pressurized gaseous fluid source through conduit means including a control member allowing said fluid to enter said cavity when the annular electrode has been brought into its operative position and has caused the temperature of the sheet material to exceed its melting point.

* * * * *